United States Patent
Musoll

(10) Patent No.: US 10,003,551 B2
(45) Date of Patent: Jun. 19, 2018

(54) PACKET MEMORY SYSTEM, METHOD AND DEVICE FOR PREVENTING UNDERRUN

(71) Applicant: CAVIUM, INC., San Jose, CA (US)

(72) Inventor: Enrique Musoll, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 102 days.

(21) Appl. No.: 14/673,807

(22) Filed: Mar. 30, 2015

(65) Prior Publication Data
US 2016/0294729 A1    Oct. 6, 2016

(51) Int. Cl.
| | | |
|---|---|---|
| H04L 12/26 | (2006.01) | |
| H04L 12/54 | (2013.01) | |
| H04L 12/933 | (2013.01) | |
| H04L 12/935 | (2013.01) | |
| G06F 12/06 | (2006.01) | |
| H04L 12/18 | (2006.01) | |

(52) U.S. Cl.
CPC ........ H04L 49/103 (2013.01); G06F 12/0607 (2013.01); H04L 49/30 (2013.01); G06F 2212/1024 (2013.01); G06F 2212/1044 (2013.01); H04L 12/1881 (2013.01)

(58) Field of Classification Search
CPC .... H04L 12/1881; H04L 49/30; H04L 49/103
See application file for complete search history.

(56) References Cited

U.S. PATENT DOCUMENTS

| | | |
|---|---|---|
| 6,658,016 B1 | 12/2003 | Dai et al. |
| 6,876,649 B1 | 4/2005 | Beshai |
| 7,289,537 B1 | 10/2007 | Devanagondi et al. |
| 7,680,097 B1 | 3/2010 | Goldstein et al. |
| 9,195,622 B1 | 11/2015 | Roitshtein |
| 9,582,440 B2 | 2/2017 | Gabbay et al. |
| 2003/0043742 A1* | 3/2003 | De Maria ............... H04L 47/10 370/230 |
| 2006/0006905 A1 | 1/2006 | Chou et al. |
| 2006/0104275 A1* | 5/2006 | Dohm ..................... H04L 12/18 370/390 |
| 2007/0047535 A1* | 3/2007 | Varma ..................... H04L 47/10 370/360 |
| 2007/0127469 A1 | 6/2007 | Rashid et al. |
| 2009/0073873 A1 | 3/2009 | MacAdam et al. |
| 2009/0074408 A1 | 3/2009 | Black et al. |
| 2014/0149602 A1 | 5/2014 | Madaiah et al. |
| 2014/0211634 A1 | 7/2014 | Matthews et al. |
| 2014/0214955 A1 | 7/2014 | Vash et al. |
| 2015/0188850 A1 | 7/2015 | Chan et al. |
| 2015/0312160 A1* | 10/2015 | Griswold ............... H04L 49/351 370/412 |
| 2016/0119220 A1 | 4/2016 | Singh |

* cited by examiner

*Primary Examiner* — Charles C Jiang
*Assistant Examiner* — Ryan Kavleski
(74) *Attorney, Agent, or Firm* — Haverstock & Owens LLP

(57) ABSTRACT

A packet memory system for selectively outputting received packets on one or more output ports. The packet memory system including a controller for controlling the output ports. Specifically, for packets of multicast or broadcast traffic that needs to be output from a plurality of the ports, the controller designates one or more reader ports that read the packet data from a packet memory such that the remainder of the ports are able to simply listen for the read packet data without performing a read operation.

30 Claims, 3 Drawing Sheets

PACKET MEMORY SYSTEM, METHOD AND DEVICE FOR PREVENTING UNDERRUN

FIELD OF INVENTION

The present invention relates to a packet memory system. More particularly, the present invention relates to preventing underrun in a packet memory system.

BACKGROUND OF THE INVENTION

A packet-processing device, like a switch microchip, usually needs to buffer the packets into a packet buffer memory (PM) having one or more banks while the device processes them. The size of some packets (for example Ethernet packets) is not known up-front, so the device needs to start storing the packet into the packet buffer without knowing how large the packet is. Moreover, packets arrive at the device in an interleaved fashion, so the device is simultaneously storing several incoming packets into the packet buffer. The state-of-the-art solution to store the packet in the device's packet memory is to assign multiple chunks (called pages) of packet memory to each packet, rather than a single big chunk. With this scheme, the packet is not stored consecutively in the banks of the packet memory, but rather scattered in one or more pages throughout multiple banks of the packet memory. As a result, a linked list of all the pages (and therefore banks) that a particular packet uses needs to be maintained in the switch; this linked list is then traversed to locate and read out the packet from the packet memory for transmission.

In a type of packet traffic known as broadcast traffic, all of the output ports of the device are requested to output the same packet data. Similarly, in a type of packet traffic known as multicast traffic, a plurality (but not all) of the output ports of the device are requested to output the same packet data. Therefore, for such traffic all these output ports will request the packet memory for the same packet data. This can create performance issues in the device because it causes a large number of output ports request for the same data at roughly the same time. Specifically, when this happens often a small number of banks of the packet memory will need to serve all the requests while the other banks remain idle. As a result, although some of the output ports would get the data fast, others would need to wait a relatively long time to obtain the data because the a small subset of banks needs to serialize all the requests from the output ports due to the usually small number of read ports per bank.

This waiting time for the data has two undesirable consequences. If the data corresponds to the start of the packet, the transmission of the whole packet will be delayed. This implies a degradation in bandwidth of the port since it is waiting to send data when it actually could be sending data. If the data corresponds to the middle of the packet and some of the data of the packet has already been transmitted, the output port fails to transmit at the required rate and incurs into an underrun error. This is more severe than the performance degradation described above because the packet is transmitted with an error and the receiver will have to discard the packet, causing in some cases the costly retransmission of the packet. The second case described above is most common when the switch is working in cut-thru mode. In this mode, all the output ports that need to transmit the packet will do so at roughly the same time because they are instructed to transmit the packet as soon as possible without waiting for the entire packet to be received.

BRIEF SUMMARY OF THE INVENTION

A packet memory system for selectively outputting received packets on one or more output ports. The packet memory system including a controller for controlling the output ports. Specifically, for packets of multicast or broadcast traffic that needs to be output from a plurality of the ports, the controller designates one or more reader ports that read the packet data from a packet memory such that the remainder of the ports are able to simply listen for the read packet data without performing a read operation.

A first aspect is directed to a packet memory system, the system comprises a non-transitory computer-readable packet memory comprising one or more memory banks for storing packet data of a packet input by the system, wherein the packet data as stored on the memory banks is organized according to one or more pages mapped to the memory banks, a plurality of output ports coupled with the packet memory and configured to selectively read the packet data from the packet memory and output the packet data out of the system and a controller coupled with the plurality of output ports for controlling which of the ports output the packet data, wherein if the packet data is to be output from two or more of the ports, the controller commands less than all of the two or more of the ports to cause the packet data to be read out from the packet memory and transmitted to all of the two or more of the ports. In some embodiments, the plurality of output ports and the controller are operating in a cut-thru mode such that each of the plurality of output ports begin to output packet data before the entirety of the packet has been received. In some embodiments, the controller commands all of the two or more of the ports to listen for and output the packet data after the packet data is read out from the packet memory based on a packet data identifier the controller sends to all of the two or more of the ports. In some embodiments, each of the less than all of the two or more of the ports causes a different part of the packet data to be read out from the packet memory. In some embodiments, the different part of the packet data of each of the less than all of the two or more of the ports is determined by the controller based on how the packet data is apportioned between the pages. In some embodiments, a quantity of the less than all of the two or more of the ports is determined by the controller based on a quantity of the pages on which the packet data is stored. In some embodiments, the controller selects the less than all of the two or more of the ports based on a congestion level of each of the two or more of the ports. In some embodiments, each of the plurality of output ports comprise a buffer that stores a list identifying one or more packets that have been assigned to be output by the port by the controller, but have not yet been output by the port, and further wherein the congestion level of each of the two or more of the ports is based on a current quantity of packets identified by the list of the buffer of the port. In some embodiments, the less than all of the two or more of the ports is exactly one of the two or more of the ports that causes all of the packet data to be read out from the packet memory. In some embodiments, the less than all of the two or more ports is exactly a first port and a second port of the two or more of the ports, and further wherein the controller commands the first port to cause a first portion of the packet data to be read out and the second port to cause a remainder of the packet data that was not included within the first portion to be read out. In some embodiments, the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

A second aspect is directed to a controller stored on a non-transitory computer-readable medium and coupled with a plurality of output ports that selectively read and output packet data of a packet from a packet memory, wherein the packet memory has one or more memory banks storing the packet data, and further wherein the controller is configured to, if the packet data is to be output from two or more of the ports, command less than all of the two or more of the ports to cause the packet data to be read out from the packet memory and transmitted to all of the two or more of the ports. In some embodiments, the plurality of output ports and the controller are operating in a cut-thru mode such that each of the plurality of output ports begin to output packet data before the entirety of the packet has been received. In some embodiments, the controller is configured to command all of the two or more of the ports to listen for and output the packet data after the packet data is read out from the packet memory based on a packet data identifier the controller sends to all of the two or more of the ports. In some embodiments, each of the less than all of the two or more of the ports causes a different part of the packet data to be read out from the packet memory. In some embodiments, the packet data as stored on the memory banks is organized according to one or more pages mapped to the memory banks, further wherein the different part of the packet data of each of the less than all of the two or more of the ports is determined by the controller based on how the packet data is apportioned between the pages. In some embodiments, the controller is configured to determine a quantity of the less than all of the two or more of the ports based on a quantity of the pages on which the packet data is stored. In some embodiments, the controller is configured to select the less than all of the two or more of the ports based on a congestion level of each of the two or more of the ports. In some embodiments, each of the plurality of output ports comprise a buffer that stores a list identifying one or more packets that have been assigned to be output by the port by the controller, but have not yet been output by the port, and further wherein the congestion level of each of the two or more of the ports is based on a current quantity of packets identified by the list of the buffer of the port. In some embodiments, the less than all of the two or more of the ports is exactly one of the two or more of the ports that causes all of the packet data to be read out from the packet memory. In some embodiments, the less than all of the two or more ports is exactly a first port and a second port of the two or more of the ports, and further wherein the controller is configured to command the first port to cause a first portion of the packet data to be read out and the second port to cause a remainder of the packet data that was not included within the first portion to be read out. In some embodiments, the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

A third aspect is directed to a method of operating a packet memory system. The method comprises storing packet data of a packet on one or more memory banks of a non-transitory computer-readable packet memory, wherein the storing of the packet data on the memory banks comprises organizing the packet data as stored on the memory banks according to one or more pages mapped to the memory banks, if the packet data is to be output from two or more of a plurality of output ports coupled to the packet memory, commanding less than all of the two or more of the ports to cause the packet data to be read out from the packet memory and transmitted to all of the two or more of the ports with a controller coupled to the output ports and outputting the packet data from each of the two or more of the ports with the two or more of the ports. In some embodiments, the plurality of output ports and the controller are operating in a cut-thru mode such that the outputting of the packet data by each of the two or more of the ports comprises beginning to output at least a portion of the packet data before the entirety of the packet has been received. In some embodiments, the method further comprises commanding all of the two or more of the ports to listen for and output the packet data after the packet data is read out from the packet memory with the controller based on a packet data identifier the controller sends to all of the two or more of the ports. In some embodiments, each of the less than all of the two or more of the ports causes a different part of the packet data to be read out from the packet memory. In some embodiments, the method further comprises determining the different part of the packet data of each of the less than all of the two or more of the ports with the controller based on how the packet data is apportioned between the pages. In some embodiments, the method further comprises determining a quantity of the less than all of the two or more of the ports with the controller based on a quantity of the pages on which the packet data is stored. In some embodiments, the method further comprises selecting the less than all of the two or more of the ports with the controller based on a congestion level of each of the two or more of the ports. In some embodiments, each of the plurality of output ports comprise a buffer that stores a list identifying one or more packets that have been assigned to be output by the port by the controller, but have not yet been output by the port, and further wherein the congestion level of each of the two or more of the ports is based on a current quantity of packets identified by the list of the buffer of the port. In some embodiments, the less than all of the two or more of the ports is exactly one of the two or more of the ports that causes all of the packet data to be read out from the packet memory. In some embodiments, the less than all of the two or more ports is exactly a first port and a second port of the two or more of the ports, further comprising commanding the first port to cause a first portion of the packet data to be read out and the second port to cause a remainder of the packet data that was not included within the first portion to be read out with the controller. In some embodiments, the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a packet memory system for selectively outputting received packets on one or more output ports. The packet memory system including a controller for controlling the output ports. Specifically, for packets of multicast or broadcast traffic that needs to be output from a plurality of the ports, the controller designates one or more reader ports that read the packet data from a packet memory such that the remainder of the ports are able to simply listen for the read packet data without performing a read operation. As a result, an essentially simultaneous attempt to accesses the packet within the packet memory by all of the output ports is prevented thereby increasing the efficiency of the system.

Figure 1:
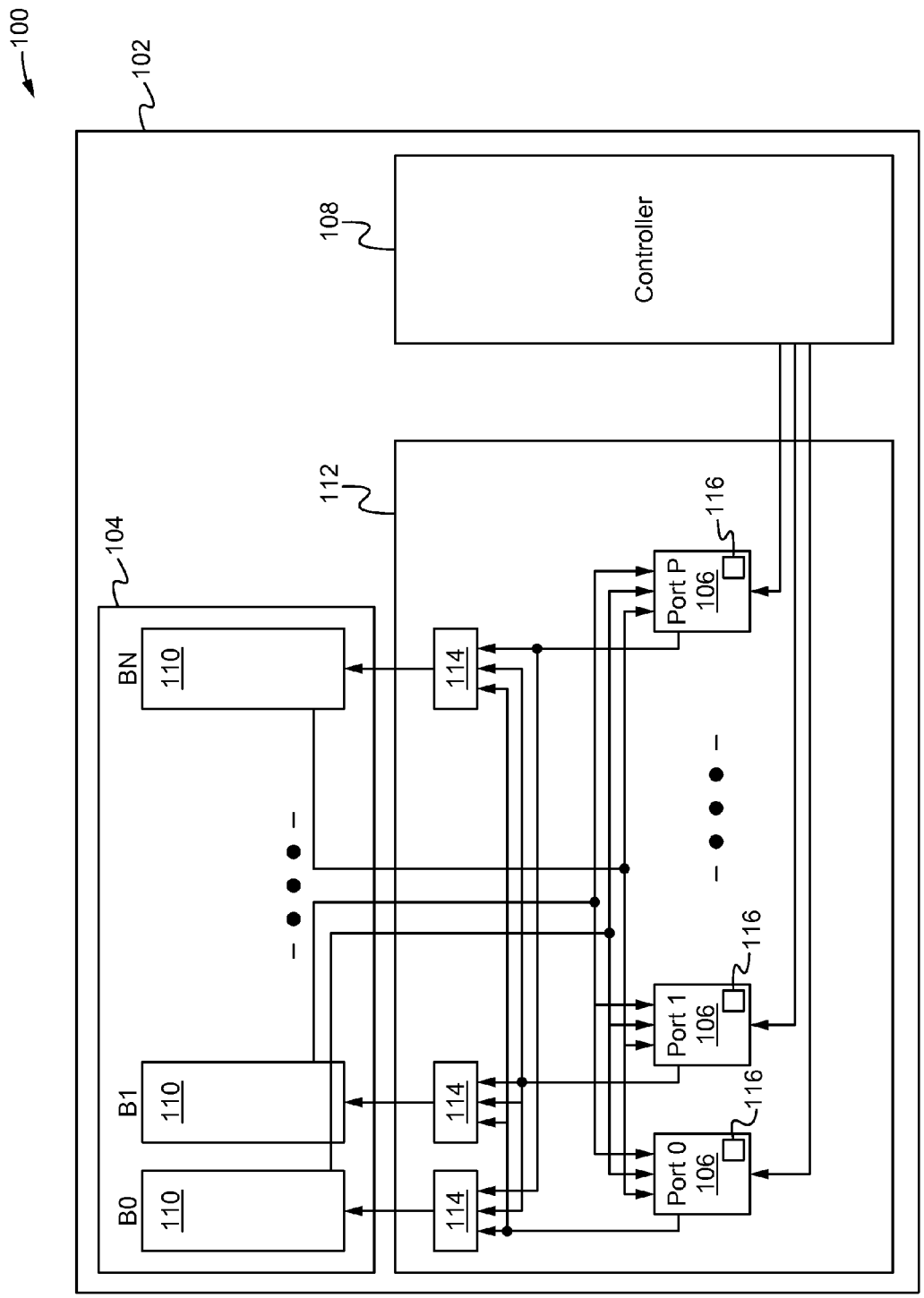
FIG. 1 illustrates a packet memory system according to some embodiments.

FIG. 1 illustrates a packet memory system 100 on a packet processing device 102 according to some embodiments. As shown in FIG. 1, the packet memory system 100 comprises one or more output ports 106 coupled with a packet memory 104 and a controller 108. The packet memory 104 comprises one or more memory banks 110 that each have one or more read and/or write ports (not shown) that enables data to be read out or written to the banks 110 each cycle. The banks 110 are coupled to each of the ports 106 such that each of the banks 110 is able to output data that is received by one, a plurality or all of the ports 106. The ports 106 each comprise a port buffer 116 and are able to be a part of a packet memory access element 112 (e.g. a direct memory access block), wherein the packet memory access element 112 is able to further comprise one or more bank address elements 114 coupled to each of the ports 106 and at least one of the banks 110. Specifically, the element 112 is able to comprise a bank address element 114 for each of the banks 110. Alternatively, there are able to be more or less bank address elements 114 than the number of banks 110. As a result, the each of the ports 106 is able to communicate with (e.g. read data from) each of the banks 110 via the associated bank address element(s) 114 and the packet memory access element 112. In some embodiments, the bank address elements 114 are bank read address multiplexers (muxes). The controller 108 is able to perform any necessary modification of the packet, decide where to send the packet, and perform any traffic management necessary. The controller 108 is coupled with each of the ports 106 such that the controller 108 is able to send control and other types of data selectively to one or more of the ports 106. Further, in some embodiments the controller 108 is able to monitor a status of and/or receive feedback data from the port buffer 116 of one or more of the ports 106.

The packet processing device 102 is able to be a packet processing circuit and/or microchip. For example, the device 102 is able to be a switch microchip (e.g. top of rack switch) for a data center or other type of packet processing circuit or application specific integrated circuit. In some embodiments, the device 102 is a software defined network programmable microchip that is able to be programmed/customized to adjust the manner in which packets are processed. Alternatively, the device 102 is able to be other types of packet processing devices known in the art. The ports 106, controller 108 and address elements 114 are able to comprise hardware, software or a combination of hardware and software, wherein the software is stored on a non-transitory computer readable medium of the device 102. The packet memory 104 is able to comprise a non-transitory computer-readable medium such as ternary content-addressable memory. Alternatively, the packet memory 104 is able to comprise other types of memory known in the art or combinations thereof. The system 100 and/or device 102 is able to operate in a normal mode and a cut-thru mode. In the normal mode, the system/device wait until an entire packet is received before starting to output it. In cut-thru mode, the controller 108 and/or the output ports 106 transmit the packet as soon as possible without waiting for the entire packet to be received.

Figure 2:
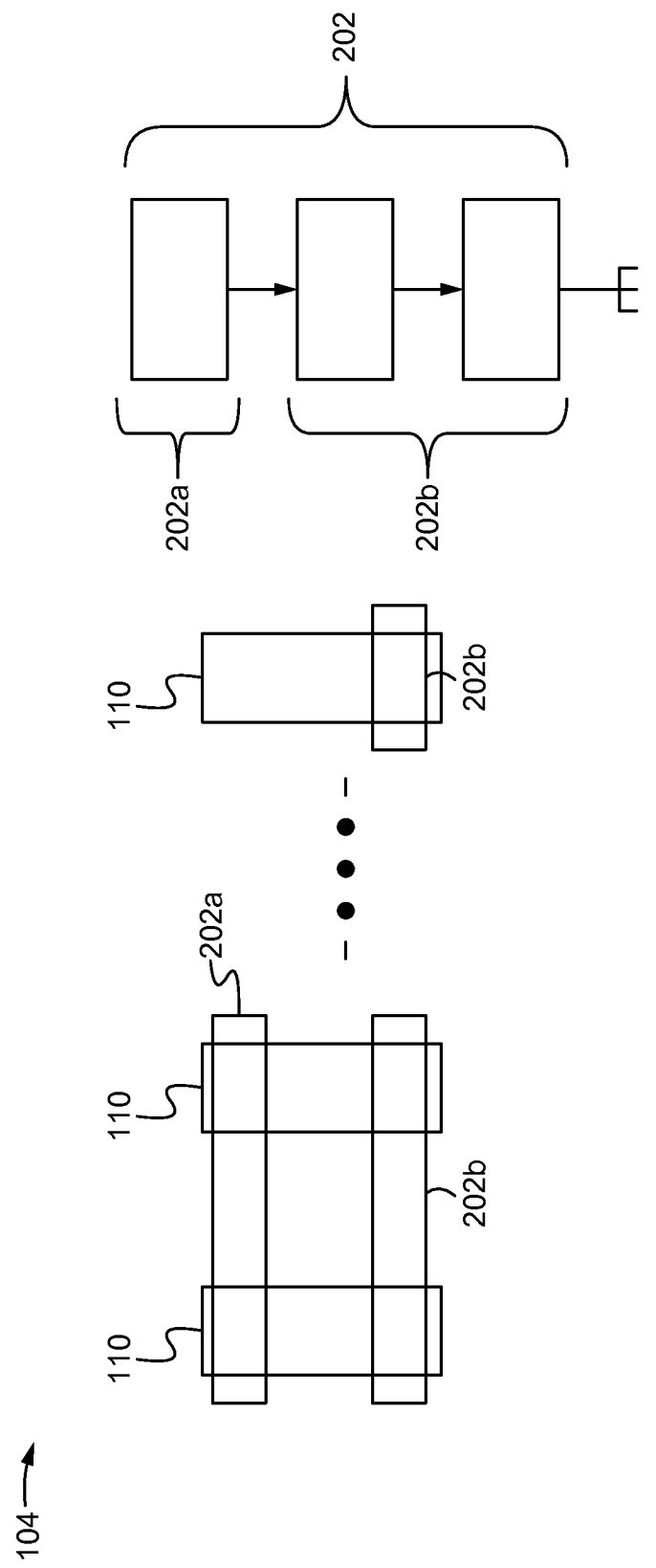
FIG. 2 illustrates a link list of pages for a packet and an exemplary mapping of the link list to the memory banks of the packet memory according to some embodiments.

FIG. 2 illustrates a link list of pages 202 for a packet and an exemplary mapping of the link list 202 to the memory banks 110 of the packet memory 104 according to some embodiments. As shown in FIG. 2, packet data of a packet is stored on one or more pages 202 mapped to the banks 110 of the packet memory 104. In particular, each of the pages 202 is able to represent (or be mapped to) one or more entries of a plurality of the banks 110. As a result, when a packet or a portion thereof is stored on one of the pages 202, it results in the packet being stored in a plurality of non-sequential locations distributed across the banks 110 within the packet memory 104 that are mapped to that page. Often a packet will require multiple pages 202 in order to store the entirety of the packet. This list of pages 202 is known as a link list and is able to be used as a map or list of pointers that point to the locations where the packet is stored on the banks 110 of the packet memory 104. Generally, a first set 202a of one or more pages of the link list 202 will include the header of the packet whereas a second set 202b of one or more pages of the link list 202 will store the body of the packet. Specifically, the header pages contain the header data that the control block processes and the body pages contain the body of the packet which is generally not altered by the device 102. As the result, the pages 202 enable the packet data of each packet to be distributed across the banks 110 such that reading or writing the packet data from or to the banks 110 is more efficient.

Although as shown in FIG. 2, the header pages 202a are mapped across two banks 110 and the body pages 202b are mapped across three banks 110, the pages 202 are each able to be mapped across more or less banks. For example, a page is able to be mapped to non-sequential entries of a single bank 110 or entries of any number of a plurality of banks 110. Alternatively, a page 202 is able to be mapped to sequential entries of a single bank 110 A packet has associated a descriptor or token that in its basic form is able to be a pointer to the first page of the link list of pages 202 storing the packet. With this initial pointer, all the pages used by the packet are able to be retrieved in the same order they were used by traversing the link list 202 as each subsequent page includes a pointer to the location of the next page in the list 202.

In operation, when the device/system 102/100 is in cut-thru mode, the controller 108 determines if a packet is a unicast traffic packet destined for output by a single target port of the ports 106 or a multicast/broadcast traffic packet destined for output by a plurality of target ports of the ports 106. If it is determined that the packet is multicast/broadcast, instead of commanding all of the target ports 106 to attempt to read the packet data of the packet from the memory 104, the controller 108 selects and commands only a subset of the target ports 106 to attempt to read the packet data. In some embodiments, the subset is only a single port 106 of the target ports 106 such that the single selected port 106 is commanded to access all of the packet data from the packet memory 104. Alternatively, the subset is able to be a plurality (but not all) of the target ports 106. In such embodiments, the selected ports 106 are able to each be commanded by the controller 108 to access a different portion of the packet data such that only after all of the port 106 have issued their requests is all of the packet data read out of the packet memory 104. In particular, the packet data is able to be divided and/or allocated amongst the subset of ports on a page by page of the link list 202 basis such that each of the subset is assigned one or more pages of the link list 202 associated with the packet. For example, if the subset is two ports 106, the controller 108 is able to allocate the pages 202a storing header data of the packet to the first port 106 of the subset and pages 202b storing body data (or the remainder) of the packet to the second port 106 of the subset.

In some embodiments, the controller 108 selects which and/or the quantity of the plurality of target ports 106 to include in the subset randomly or according to a round robin protocol. Alternatively, the controller 108 is able to select which and/or how many of the plurality of target ports 106 are included in the subset based on a current congestion level of the target ports 106. For example, the target ports 106 with the lowest levels of congestion are selected as reader ports to form the subset. In particular, the controller 108 is able to monitor, request and/or be transmitted feedback from each of the target ports 106 indicating a current level of traffic congestion. In some embodiments, the congestion level of each port 106 is based on a quantity of pending packets that have been assigned to be output by the port by the controller, but have not yet been output by the port as indicated by the port buffers 116 which store the command messages or tokens from the controller 108 indicating packet data that needs to be output from the port 106. For example, the port buffers 116 are able operate according to a first in first out protocol, wherein identifiers (e.g. descriptors or tokens) of packets or packet data to be output is received by the buffer 116 and then only removed from the buffer 116 when the associated packet or packet data has been received and output by the port 106. Thus, the quantity of identifiers stored in the buffer 116 represents a current backlog or congestion level of the port 106. Alternatively, the congestion level is able to be based on other metrics and/or factors.

In some embodiments, the controller 108 is able to determine the quantity of ports (of the target ports) that are to be designated as the subset of reader ports 106 based on a size of the packet (e.g. number of pages storing packet, number of bytes), a number of different types of data of the packet and/or based on the current congestion level of the target ports 106. For example, based on a congestion level of a first selected port 106, the controller 108 is able to limit a number of pages of the packet assigned to the first port 106 and determine that one or more additional ports 106 are needed, wherein the same page number limitation and/or addition of selected ports 106 is able to be performed for each additional port 106 until all of the packet data has been assigned to a target port 106 thereby forming the subset. In other words, the higher the congestion level, the lower the number of pages and/or quantity of packet data that will be assigned to a selected target port 106, wherein if not all of the data is able to be allocated amongst the currently selected ports 106 due to the congestion constraints, one or more ports 106 are able to be added as selected reader ports 106.

Once the subset of target ports 106 has been determined by the controller 108, the controller 108 sends a reader message to each of the subset. The reader message comprises a reader identifier, a packet identifier (e.g. descriptor or token), a port identifier, and/or a packet data identifier. The reader identifier indicates to the port 106 that it needs to issue a read access request to read out the packet data indicated by the packet data indicator from the location within the entries of the banks 110 of the packet memory 104 indicated by the packet data indicator. The port identifier identifies the port 106 to which the reader message is directed and thereby enables the port 106 to know the message is intended for that port 106. The packet identifier uniquely identifies the packet and the packet data identifier identifies the packet data or portion thereof that the port 106 is being directed to read out from the packet memory 104. For example, the packet data identifier is able to identify one or more of the pages of the link list 202 associated with the packet such that based on the locations within the banks 110 pointed to by the pages, the selected reader ports 106 are able to issue read access messages that cause the packet data stored on the identified pages to be read out from the packet memory 104. In some embodiments, the port identifier is able to be omitted and/or the packet identifier and the packet data identifier are able to match or be only a single identifier. For example, if the subset is only a single port 106, the packet identifier itself is able to be used to identify the packet data (e.g. via the associated link list 202). Additionally, the packet identifier is able to be attached to all of the access requests and then all of the packet data as the data is read out and transmitted to all of the ports 106 on the device 102 such that all the target ports 106 are able to identify and output the packet data based on the attached packet identifier when it is received.

The controller 108 is also able to send listener messages to each of the target ports 106 that were not included within the selected subset. These listener messages are similar to the reader message except that the packet data identifier is able to be omitted and the reader identifier is able to be omitted and/or indicate that the port 106 is not a reader and instead only needs to monitor/listen to the output from the packet memory 104 for the packet data having an attached packet identifier that matches the identifier indicated in the listener message. As a result, the non-selected or remainder of the target ports 106 will not attempt to read the packet data from the packet memory 104 and instead will only listen/monitor for the packet data when it is read out from the memory 104 to all of the ports 106 based on the access attempts of the subset.

After receiving the reader messages, the selected target ports 106 issue a packet data request for the data at the entries of the banks 110 indicated by the packet data identifier and/or packet identifier as including the needed packet data. As described above, these reader access requests are able to include the packet identifier such that the packet data, when read out from the packet memory 104, is able to have the packet identifier attached such that all of the target ports (the subset and the remainder) can receive and output the read out packet data by matching the packet identifier attached to the data to the packet identifier in the received reader/listener message. The selected subset of the ports 106 are able to issue as many read access requests to the packet memory 104 as needed to retrieve the packet data indicated by the controller 108. For example, for the pages assigned to each port 106, the port 106 is able to start with a first location within the memory 104 indicated by the first page of the assigned pages, and then proceed to a next location within the packet memory 104 indicated by the next page in the link-list 202 until all of the pages assigned to the port 106 have been issued access/read requests.

These requests are able to occur inside the access element 112. Specifically, the request are transmitted from the subset of ports 106 to the bank address elements 114 associated with the bank 110 where the needed packet data is stored (as indicated by the pages 202). The bank address elements 114 then arbitrate which ports 106 who issued a read access request will get access to the one or more read ports of associated bank 110 for that cycle. This arbitration is able to be independent or to occur independently for each address element 114 and therefore for each bank 110. Subsequently, as described above, the read port of the accessed bank 110 propagates the packet identifier of the request to the packet data read out and this read out packet data is transmitted to all of the ports 106 on the device 102. Thus, upon receiving the packet data, each port 106 is able to compare packet identifiers assigned to the port 106 with the propagated packet identifier attached to the packet data, and if they match, consume and output the data. As a result, all of the target ports 106 will consume the multicast/broadcast packet data and output the data directed by the controller 108 despite only the subset ports 106 actually requesting the data from the packet memory 104. Thus, the system 100 provides the advantage of the contention to the banks 110 is decreased in multicast traffic and therefore the probability of packet underruns is removed or minimized especially during a cut-thru mode.

Figure 3:
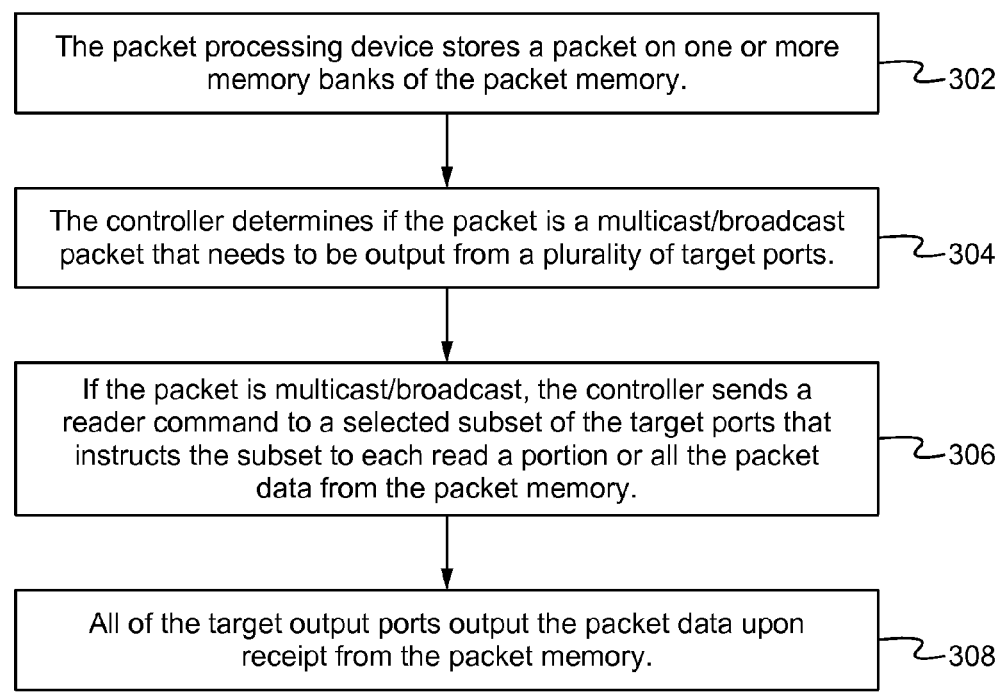
FIG. 3 illustrates a method of preventing underrun in a packet memory system according to some embodiments.

FIG. 3 illustrates a method of preventing underrun in a packet memory system according to some embodiments. As shown in FIG. 3, the packet processing device 102 stores one or more packets on one or more memory banks 110 of the packet memory 104 at the step 302. As described above, each packet is able to be stored on one or more pages of a link list 202 mapped to a plurality of locations in the packet memory 104. The controller 108 determines if a packet is a multicast/broadcast packet that needs to be output from a plurality of target ports 106 at the step 304. If the packet is multicast or broadcast, the controller 108 sends a reader command to a selected subset of the target ports 106 that instructs the each of the subset to read a portion or all of the packet data from the packet memory 104 at the step 306. All of the target output ports 106 output the packet data upon receipt from the packet memory 103 at the step 308. In some embodiments, the device 102 is in a cut-thru mode such that the outputting of the packet data by the target ports 106 comprises beginning to output at least a portion of the packet data before the entirety of the packet has been received. In some embodiments, the method further comprises, if the packet is multicast or broadcast, the controller 108 sends a listener command to a remainder of the target ports 106 that are not selected and instructs the each of the remainder to listen/monitor for and input the packet data when it is read out from the packet memory 104 by the subset. Thus, the method provides the advantage of reducing the read access traffic sent to the banks 110 of the packet data for multicast/broadcast packet data.

The packet memory system described herein has numerous advantages. In particular, the system provides the advantage of reducing the number of packet memory accesses to read the packet that need to be sent from the ports and thereby reducing contention for the bank read ports. Indeed, this in turn reduces the potential for packet underruns and helps port bandwidth performance. Further, the bandwidth of the packet memory is increased when a plurality but not all of the target ports are designated as readers such that an appropriate amount of parallel data accesses are able to be performed. In particular, the division of the packet data amongst the plurality of ports is able to help prevent even all of the selected ports from needing to access the same bank at the same time. Moreover, by utilizing congestion feedback from the ports, the controller is able to provide the benefit of better distributing the read access load amongst the target ports in addition to determining what quantity of ports are needed. Thus, the system again is able to reduce the potential for packet underruns and help port bandwidth performance.

While the invention has been described with reference to numerous specific details, one of ordinary skill in the art will recognize that the invention can be embodied in other specific forms without departing from the spirit of the invention. For example, although the different methods and operations described herein describe a particular order of steps, other orders are contemplated as well as the omission of one or more of the steps and/or the addition of one or more new steps. Moreover, although the methods and operations above are described herein separately, one or more of the methods and operations are able to be combined (in whole or part). Thus, one of ordinary skill in the art will understand that the invention is not to be limited by the foregoing illustrative details, but rather is to be defined by the appended claims.

I claim:

1. A packet memory system, the system comprising:
   a non-transitory computer-readable packet memory comprising one or more memory banks for storing packet data of a packet input by the system, wherein the packet data as stored on the memory banks is organized according to one or more pages mapped to the memory banks;
   a plurality of output ports coupled with the packet memory and configured to selectively read the packet data from the packet memory and output the packet data out of the system; and
   a controller coupled with the plurality of output ports for controlling which of the ports output the packet data, wherein when the packet data is to be output from two or more of the ports, the controller commands a subset of the two or more of the ports to cause the packet data to be read out from the packet memory and shared with all of the two or more of the ports, wherein the commanding causes a remainder of the two or more of the ports that is not a part of the subset to receive the packet data without needing to read the packet data from the packet memory, and further wherein the controller commands all of the two or more ports to listen for and output the packet data after the packet data is read out from the packet memory.

2. The system of claim 1, wherein the plurality of output ports and the controller are operating in a cut-thru mode causing each of the plurality of output ports to begin to output packet data before the entirety of the packet data has been received.

3. The system of claim 2, wherein the controller commands all of the two or more of the ports to listen for and output the packet data after the packet data is read out from the packet memory based on a packet data identifier the controller sends to all of the two or more of the ports.

4. A packet memory system, the system comprising:
   a non-transitory computer-readable packet memory comprising one or more memory banks for storing packet data of a packet input by the system, wherein the packet data as stored on the memory banks is organized according to one or more pages mapped to the memory banks;

a plurality of output ports coupled with the packet memory and configured to selectively read the packet data from the packet memory and output the packet data out of the system; and a controller coupled with the plurality of output ports for controlling which of the ports output the packet data, wherein when the packet data is to be output from two or more of the ports, the controller commands a subset of the two or more of the ports to cause the packet data to be read out from the packet memory and transmitted to all of the two or more of the ports, wherein each of the subset of the two or more of the ports causes a different part of the packet data to be read out from the packet memory, further wherein the different part of the packet data of each of the subset of the two or more of the ports is determined by the controller based on how the packet data is apportioned between the pages, and further wherein the controller commands all of the two or more ports to listen for and output the packet data after the packet data is read out from the packet memory.

5. The system of claim 3, wherein a quantity of the subset of the two or more of the ports is determined by the controller based on a quantity of the one or more pages on which the packet data is stored.

6. The system of claim 5, wherein the controller selects the subset of the two or more of the ports based on a congestion level of each of the two or more of the ports.

7. The system of claim 6, wherein each of the plurality of output ports comprise a buffer that stores a list identifying one or more packets that have been assigned to be output by the port by the controller, but have not yet been output by the port, and further wherein the congestion level of each of the two or more of the ports is based on a current quantity of one or more packets identified by the list of the buffer of the port.

8. The system of claim 6, wherein the subset of the two or more of the ports is exactly one of the two or more of the ports that causes all of the packet data to be read out from the packet memory.

9. The system of claim 6, wherein the subset of the two or more ports is exactly a first port and a second port of the two or more of the ports, and further wherein the controller commands the first port to cause a first portion of the packet data to be read out and the second port to cause a remainder of the packet data that was not included within the first portion to be read out.

10. The system of claim 9, wherein the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

11. A controller stored on a non-transitory computer-readable medium and coupled with a plurality of output ports that selectively read and output packet data of a packet from a packet memory, wherein the packet memory has one or more memory banks storing the packet data, further wherein the controller is configured to, when the packet data is to be output from two or more of the ports, command a subset of the two or more of the ports to cause the packet data to be read out from the packet memory and shared with all of the two or more of the ports, wherein the command causes a remainder of the two or more of the ports that is not a part of the subset to receive the packet data without needing to read the packet data from the packet memory, and further wherein the controller is configured to command all of the two or more ports to listen for and output the packet data after the packet data is read out from the packet memory.

12. The controller of claim 11, wherein the plurality of output ports and the controller are operating in a cut-thru mode causing each of the plurality of output ports to begin to output packet data before the entirety of the packet has been received.

13. The controller of claim 12, wherein the controller is configured to command all of the two or more of the ports to listen for and output the packet data after the packet data is read out from the packet memory based on a packet data identifier the controller sends to all of the two or more of the ports.

14. A controller stored on a non-transitory computer-readable medium and coupled with a plurality of output ports that selectively read and output packet data of a packet from a packet memory, wherein the packet memory has one or more memory banks storing the packet data, further wherein the controller is configured to, when the packet data is to be output from two or more of the ports, command a subset of the two or more of the ports to cause the packet data to be read out from the packet memory and transmitted to all of the two or more of the ports, wherein each of the subset of the two or more of the ports causes a different part of the packet data to be read out from the packet memory, and further wherein the packet data as stored on the memory banks is organized according to one or more pages mapped to the memory banks, further wherein the different part of the packet data of each of the subset of the two or more of the ports is determined by the controller based on how the packet data is apportioned between the pages, and further wherein the controller is configured to command all of the two or more ports to listen for and output the packet data after the packet data is read out from the packet memory.

15. The controller of claim 12, wherein the controller is configured to determine a quantity of the subset of the two or more of the ports based on a quantity of the pages on which the packet data is stored.

16. The controller of claim 15, wherein the controller is configured to select the subset of the two or more of the ports based on a congestion level of each of the two or more of the ports.

17. The controller of claim 16, wherein each of the plurality of output ports comprise a buffer that stores a list identifying one or more packets that have been assigned to be output by the port by the controller, but have not yet been output by the port, and further wherein the congestion level of each of the two or more of the ports is based on a current quantity of packets identified by the list of the buffer of the port.

18. The controller of claim 16, wherein the subset of the two or more of the ports is exactly one of the two or more of the ports that causes all of the packet data to be read out from the packet memory.

19. The controller of claim 16, wherein the subset of the two or more ports is exactly a first port and a second port of the two or more of the ports, and further wherein the controller is configured to command the first port to cause a first portion of the packet data to be read out and the second port to cause a remainder of the packet data that was not included within the first portion to be read out.

20. The controller of claim 19, wherein the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

21. A method of operating a packet memory system, the method comprising:

storing packet data of a packet on one or more memory banks of a non-transitory computer-readable packet memory, wherein the storing of the packet data on the memory banks comprises organizing the packet data as stored on the memory banks according to one or more pages mapped to the memory banks;

when the packet data is to be output from two or more of a plurality of output ports coupled to the packet memory, commanding a subset of the two or more of the ports to cause the packet data to be read out from the packet memory and shared with all of the two or more of the ports with a controller coupled to the output ports, wherein the commanding causes a remainder of the two or more of the ports that is not a part of the subset to receive the packet data without needing to read the packet data from the packet memory; and outputting the packet data from each of the two or more of the ports with the two or more of the ports.

22. The method of claim 21, wherein the plurality of output ports and the controller are operating in a cut-thru mode causing the outputting of the packet data by each of the two or more of the ports to comprise beginning to output at least a portion of the packet data before the entirety of the packet has been received.

23. The method of claim 22, further comprising commanding all of the two or more of the ports to listen for and output the packet data after the packet data is read out from the packet memory with the controller based on a packet data identifier the controller sends to all of the two or more of the ports.

24. A method of operating a packet memory system, the method comprising:

storing packet data of a packet on one or more memory banks of a non-transitory computer-readable packet memory, wherein the storing of the packet data on the memory banks comprises organizing the packet data as stored on the memory banks according to one or more pages mapped to the memory banks;

when the packet data is to be output from two or more of a plurality of output ports coupled to the packet memory, commanding a subset of the two or more of the ports to cause the packet data to be read out from the packet memory and transmitted to all of the two or more of the ports with a controller coupled to the output ports;

outputting the packet data from each of the two or more of the ports with the two or more of the ports, wherein each of the subset of the two or more of the ports causes a different part of the packet data to be read out from the packet memory; and determining the different part of the packet data of each of the subset of the two or more of the ports with the controller based on how the packet data is apportioned between the pages.

25. The method of claim 23, further comprising determining a quantity of the subset of the two or more of the ports with the controller based on a quantity of the pages on which the packet data is stored.

26. The method of claim 25, further comprising selecting the subset of the two or more of the ports with the controller based on a congestion level of each of the two or more of the ports.

27. The method of claim 26, wherein each of the plurality of output ports comprise a buffer that stores a list identifying one or more packets that have been assigned to be output by the port by the controller, but have not yet been output by the port, and further wherein the congestion level of each of the two or more of the ports is based on a current quantity of one or more packets identified by the list of the buffer of the port.

28. The method of claim 26, wherein the subset of the two or more of the ports is exactly one of the two or more of the ports that causes all of the packet data to be read out from the packet memory.

29. The method of claim 26, wherein the subset of the two or more ports is exactly a first port and a second port of the two or more of the ports, further comprising commanding the first port to cause a first portion of the packet data to be read out and the second port to cause a remainder of the packet data that was not included within the first portion to be read out with the controller.

30. The method of claim 29, wherein the first portion is stored on one or more first pages of the pages mapped to the memory banks and includes the header of the packet data, and further wherein the remainder of the packet data is stored on one or more second pages of the pages mapped to the memory banks and includes the remainder of the packet data not included within the first pages.

* * * * *